Feb. 19, 1929.
J. F. BUHR
1,702,810
TAPPING CHUCK
Filed Dec. 29, 1923
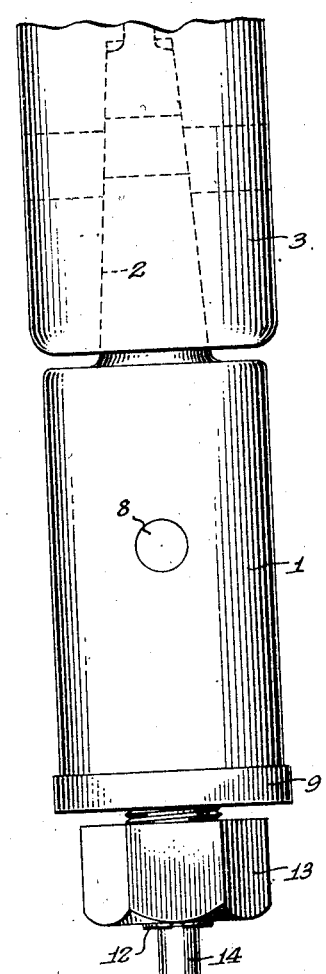
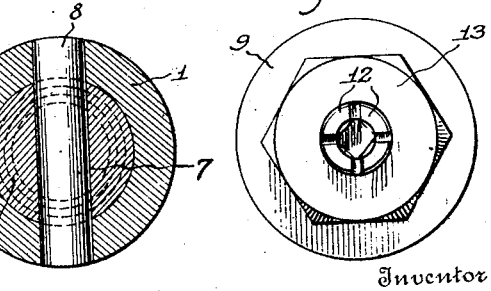
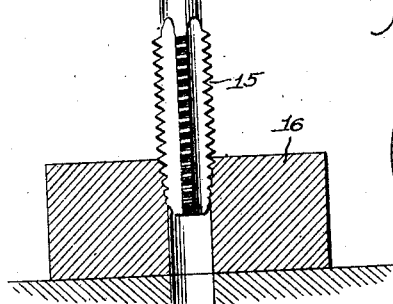
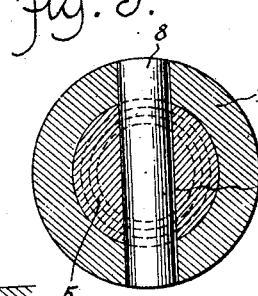
Inventor
Joseph F. Buhr,
By
Attorneys Patented Feb. 19, 1929.

1,702,810

UNITED STATES PATENT OFFICE.

JOSEPH F. BUHR, OF DETROIT, MICHIGAN.

TAPPING CHUCK.

Application filed December 29, 1923. Serial No. 683,335.

This invention relates to tap chucks and has special reference to chucks that may be advantageously used in connection with multiple drilling machines having a multiplicity of taps, bits, drills or other tools adapted to be operated in synchronism to produce a multiplicity of holes, recesses or sockets in a piece of work.

In tapping a piece of work with a multiplicity of taps, it will be found that some taps lag behind others when being withdrawn from the piece of work. Such irregularities often result in one or more taps being injured or broken or screwthreads, hole walls or holes of the piece of work not uniform. To prevent a tap from being forced or broken, when being withdrawn from a piece of work, I have put into practice a tap chuck embodying positive and reliable means for yieldably holding a tap relative to a chuck or socket so that while it is being retracted it may not be necessarily forced to produce any irregularity in a hole.

My invention will be hereinafter described in detail and reference will now be had to the drawings, wherein Figure 1 is a side elevation of one form of my tap chuck;

Fig. 2 is a vertical sectional view of the same;

Fig. 3 is a horizontal sectional view taken on the line III—III of Fig. 2, and

Fig. 4 is a view of a bottom of the tap chuck.

The reference numeral 1 denotes a cylindrical socket having a shank 2 adapted to fit in a rotary and reciprocatory spindle 3, shaft or the like member forming part of a single or multiple spindle machine (not shown).

The socket 1 has a longitudinal chamber 4 and slidable in said chamber is the head 5 of a tap or tool holder 6. The head 5 has a transverse slot 7, which may have its upper end open or closed, and extending through said slot is a pin 8 carried by the socket 1 and establishing a driving relation between said socket and the holder 6. During a driving action of the tap chuck, the head 5 engages the upper wall of the chamber 4 and when the tap chuck is retracted, the head 5 may move away from the upper chamber wall.

Screwed into the chamber 4 is a cap 9 provided with a central opening 10 through which extends the holder 6, said holder being surrounded by a coiled expansion spring 11 between the cap 9 and the head 5 with the expansive force of said spring holding the holder 6 normally elevated against the upper wall of the chamber 4.

The outer end of the holder 6 is longitudinally slotted or bifurcated to form a plurality of tap or tool gripping jaws 12 which are adapted to be retracted against a tap or tool by a nut 13 screwed on the jaws 12 of the holder 6, said jaws and nut constituting a conventional form of chuck by which the shank or stem 14 of a tool 15 may be gripped and its inner end or tang held in a recess 27 provided therefor in the end of the holder 6, said recess having flat facets so as to establish a positive driving relation between an outer tang and a holder 6.

The spindle or shaft 3 is adapted to be lowered to place the tool 15 in an operative position relative to a piece of work 16 and as the shaft 3 is lowered, it is rotated so that the tool 15 may enter the piece of work. Since there is a driving relation between the socket 1 and the holder 6 it is obvious that the tool may be driven into the piece of work with the socket and holder in the relation shown in Fig. 2. When it comes to backing the tool 15 out of the piece of work 16, the spindle or shaft 3 may be raised faster than the tool can be withdrawn. If so, there is a yieldable longitudinal movement between the socket and holder without destroying the driving relation therebetween, therefore the tool 15 may be unscrewed and withdrawn in the usual way without any danger of a fast upward movement of the spindle or shaft 3 causing the tool 15 to injure the work performed thereby. This is particularly true in a threading tool or boring instrumentality, for if a threading tool is withdrawn too quickly the unscrewing action will cause the tool to disrupt, enlarge or otherwise injure the threads. Even with a hole supposed to have smooth walls such walls are liable to be injured and all of this is prevented by permitting the tool, when receding, to naturally drift and feel its way just as though manipulated by hand.

The holder 6 has a longitudinal bore 17 affording clearance for borings or material removed from said holder during its formation, and the socket 1 is provided with a lubricant port 28 so that lubricant may be placed in said socket to insure easy movement of the head 5 relative to the walls of the chamber 4 and the transverse pin 8.

What I claim is:—

A tool chuck comprising a socket, means for connecting said socket to a drive spindle, a holder having a head slidably mounted in said socket, and limited in its movement by abutting the upper wall of said socket, said head having a slot formed therein, a pin carried by said socket and extending through the slot of said head to define the outward movement of said holder in said socket, a cap carried by said socket and through which extends said holder, and a spring encircling said holder between the head thereof and said cap and holding the holder head normally in engagement with said pin.

In testimony whereof I affix my signature.

JOSEPH F. BUHR.